(12) United States Patent
Wagner et al.

(10) Patent No.: US 11,370,127 B2
(45) Date of Patent: *Jun. 28, 2022

(54) SYSTEMS AND METHODS FOR ACQUIRING AND MOVING OBJECTS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,693

(22) Filed: Oct. 19, 2020

(65) Prior Publication Data

US 2021/0031380 A1 Feb. 4, 2021

Related U.S. Application Data

(63) Continuation of application No. 16/814,658, filed on Mar. 10, 2020, which is a continuation of application (Continued)

(51) Int. Cl.
| | | |
|---|---|---|
| B25J 15/00 | (2006.01) | |
| B25J 15/06 | (2006.01) | |
| B25J 15/10 | (2006.01) | |

(52) U.S. Cl.
CPC ....... *B25J 15/0033* (2013.01); *B25J 15/0004* (2013.01); *B25J 15/0023* (2013.01); (Continued)

(58) Field of Classification Search
CPC ............... B25J 15/0004; B25J 15/0023; B25J 15/0033; B25J 15/0052; B25J 15/0095; (Continued)

(56) References Cited

U.S. PATENT DOCUMENTS

| | | | |
|---|---|---|---|
| 2,853,333 | A | 9/1958 | Littell |
| 3,005,652 | A | 10/1961 | Helm |

(Continued)

FOREIGN PATENT DOCUMENTS

| | | |
|---|---|---|
| CN | 1411420 A | 4/2003 |
| DE | 10121344 A1 | 11/2002 |

(Continued)

OTHER PUBLICATIONS

Examiner's Report issued by Innovation, Science and Economic Development Canada Canadian Intellectual Property Office in related Canadian Application No. 3,009,648 dated Aug. 17, 2021, 5 pages.

(Continued)

*Primary Examiner* — Dean J Kramer
(74) *Attorney, Agent, or Firm* — Gesmer Updegrove LLP

(57) ABSTRACT

An end effector system is disclosed for a robotic system that includes a primary acquisition system that includes a primary end effector, and a secondary retention system that substantially surrounds at least a portion of the primary acquisition system, wherein at least a portion of the primary acquisition system may be drawn up within at least a portion (Continued)

of the secondary retention system such that the primary end effector system may be used to select an object from a plurality of objects, and the secondary retention system may be used to secure the object for rapid transport to an output destination.

29 Claims, 18 Drawing Sheets

Related U.S. Application Data

No. 16/390,634, filed on Apr. 22, 2019, now Pat. No. 10,850,402, which is a continuation of application No. 15/992,841, filed on May 30, 2018, now Pat. No. 10,335,956, which is a continuation of application No. 15/371,921, filed on Dec. 7, 2016, now Pat. No. 10,011,020.

(60) Provisional application No. 62/276,653, filed on Jan. 8, 2016.

(52) U.S. Cl.
CPC ....... *B25J 15/0052* (2013.01); *B25J 15/0095* (2013.01); *B25J 15/0616* (2013.01); *B25J 15/10* (2013.01); *Y10S 901/40* (2013.01)

(58) Field of Classification Search
CPC ...... B25J 15/10; B25J 15/103; B25J 15/0616; B25J 15/0675; Y10S 901/40
See application file for complete search history.

(56) References Cited

U.S. PATENT DOCUMENTS

| | | |
|---|---|---|
| 3,195,941 A | 7/1965 | Morey |
| 3,637,249 A | 1/1972 | Kuhl et al. |
| 4,381,601 A | 5/1983 | Tamai et al. |
| 4,389,064 A | 6/1983 | Laverriere |
| 4,469,100 A | 9/1984 | Hardwick |
| 4,557,659 A | 12/1985 | Scaglia |
| 4,561,686 A | 12/1985 | Atchley |
| 4,578,013 A | 3/1986 | Barillec et al. |
| 4,653,793 A | 3/1987 | Guinot et al. |
| 4,677,778 A | 7/1987 | Sorimachi et al. |
| 4,681,063 A | 7/1987 | Hebrank |
| 4,828,304 A | 5/1989 | No et al. |
| 4,850,627 A | 7/1989 | Franklin |
| 4,858,974 A | 8/1989 | Stannek |
| 4,880,358 A | 11/1989 | Lasto |
| 5,024,575 A | 6/1991 | Anderson |
| 5,127,692 A | 7/1992 | Yakou et al. |
| 5,207,465 A | 5/1993 | Rich |
| 5,226,757 A | 7/1993 | Tarrant |
| 5,752,729 A | 5/1998 | Crozier et al. |
| 5,764,013 A | 6/1998 | Yae |
| 5,777,267 A | 7/1998 | Szydel |
| 5,865,487 A | 2/1999 | Gore et al. |
| 6,015,174 A | 1/2000 | Raes et al. |
| 6,244,640 B1 | 6/2001 | Le Bricquer et al. |
| 6,397,876 B1 | 6/2002 | Golden et al. |
| 6,721,444 B1 | 4/2004 | Gu et al. |
| 6,817,639 B2 | 11/2004 | Schmalz et al. |
| 6,846,029 B1 | 1/2005 | Ragner et al. |
| 6,994,387 B1 | 2/2006 | Ragner et al. |
| 7,004,524 B2 | 2/2006 | Marshall |
| 7,017,961 B1 | 3/2006 | Parnell et al. |
| 7,140,389 B2 | 11/2006 | Schatterer et al. |
| 7,263,890 B2 | 9/2007 | Takahashi |
| 7,311,489 B2 | 12/2007 | Ekman |
| 7,313,464 B1 | 12/2007 | Perreault et al. |
| 7,474,939 B2 | 1/2009 | Oda et al. |
| 7,618,074 B2 | 11/2009 | Zimmer |
| 7,677,622 B2 | 3/2010 | Dunkmann et al. |
| 7,726,716 B2 | 6/2010 | Shuttleworth |
| 7,785,422 B2 | 8/2010 | Autumn et al. |
| 8,070,203 B2 | 12/2011 | Schaumberger |
| 8,096,598 B2 | 1/2012 | Perlman |
| 8,132,835 B2 | 3/2012 | Ban et al. |
| 8,267,386 B2 | 9/2012 | Schaaf et al. |
| 8,414,042 B2 | 4/2013 | Landes et al. |
| 8,548,626 B2 | 10/2013 | Steltz et al. |
| 8,662,861 B2 | 3/2014 | Tell |
| 8,777,284 B2 | 7/2014 | Schaller et al. |
| 8,874,270 B2 | 10/2014 | Ando |
| 9,061,868 B1 | 6/2015 | Paulsen et al. |
| 9,259,844 B2 | 2/2016 | Xu et al. |
| 9,283,680 B2 | 3/2016 | Yasuda et al. |
| 9,492,923 B2 | 11/2016 | Wellman et al. |
| 9,604,363 B2 | 3/2017 | Ban |
| 9,623,570 B1 | 4/2017 | Krahn et al. |
| 9,656,813 B2 | 5/2017 | Dunkmann et al. |
| 9,981,379 B1 | 5/2018 | Youmans et al. |
| 9,999,977 B2 | 6/2018 | Wagner et al. |
| 10,011,020 B2 | 7/2018 | Wagner et al. |
| 10,086,519 B2 | 10/2018 | Wagner et al. |
| 10,118,300 B2 | 11/2018 | Wagner et al. |
| 10,315,315 B2 | 6/2019 | Wagner et al. |
| 10,335,956 B2 | 7/2019 | Wagner et al. |
| 10,850,402 B2 | 12/2020 | Wagner et al. |
| 2001/0045755 A1 | 11/2001 | Schick et al. |
| 2003/0038491 A1 | 2/2003 | Schmalz et al. |
| 2003/0160470 A1 | 8/2003 | Marshall |
| 2003/0164620 A1 | 9/2003 | Schmalz et al. |
| 2004/0169386 A1 | 9/2004 | Shuttleworth |
| 2004/0232716 A1 | 11/2004 | Reed et al. |
| 2006/0242785 A1 | 11/2006 | Cawley et al. |
| 2008/0179224 A1 | 7/2008 | Van Bossuyt |
| 2009/0019818 A1 | 1/2009 | Gilmore et al. |
| 2010/0040450 A1 | 2/2010 | Parnell |
| 2010/0078953 A1 | 4/2010 | Ban et al. |
| 2010/0103960 A1 | 4/2010 | Kasamatsu et al. |
| 2010/0109360 A1 | 5/2010 | Meisho |
| 2010/0175487 A1 | 7/2010 | Sato |
| 2010/0180711 A1 | 7/2010 | Kilibarda et al. |
| 2010/0241260 A1 | 9/2010 | Kilibarda et al. |
| 2011/0126681 A1 | 6/2011 | Blanchet et al. |
| 2013/0110280 A1 | 5/2013 | Folk |
| 2013/0129464 A1 | 5/2013 | Regan et al. |
| 2013/0232918 A1 | 9/2013 | Lomerson, Jr. |
| 2013/0277999 A1 | 10/2013 | Schaller et al. |
| 2014/0005831 A1 | 1/2014 | Naderer et al. |
| 2014/0067121 A1 | 3/2014 | Brooks et al. |
| 2014/0067127 A1 | 3/2014 | Gotou |
| 2014/0105719 A1 | 4/2014 | Mueller et al. |
| 2014/0260678 A1 | 9/2014 | Jentoft et al. |
| 2015/0032252 A1 | 1/2015 | Galluzzo |
| 2015/0073589 A1 | 3/2015 | Khodl et al. |
| 2015/0298316 A1 | 10/2015 | Accou et al. |
| 2015/0306770 A1 | 10/2015 | Mittal et al. |
| 2015/0328779 A1 | 11/2015 | Bowman et al. |
| 2015/0375401 A1 | 12/2015 | Dunkmann et al. |
| 2016/0167227 A1 | 6/2016 | Wellman et al. |
| 2016/0221187 A1 | 8/2016 | Bradski et al. |
| 2016/0243704 A1 | 8/2016 | Vakanski et al. |
| 2016/0271805 A1 | 9/2016 | Kuolt et al. |
| 2017/0021499 A1 | 1/2017 | Wellman et al. |
| 2017/0036354 A1 | 2/2017 | Chavan Dafle et al. |
| 2017/0050315 A1 | 2/2017 | Henry et al. |
| 2017/0057091 A1 | 3/2017 | Wagner et al. |
| 2017/0080571 A1 | 3/2017 | Wagner et al. |
| 2017/0080579 A1 | 3/2017 | Wagner et al. |
| 2017/0087718 A1 | 3/2017 | Wagner et al. |
| 2017/0087731 A1 | 3/2017 | Wagner et al. |
| 2017/0106532 A1 | 4/2017 | Wellman et al. |
| 2017/0120455 A1 | 5/2017 | Wagner et al. |
| 2017/0121113 A1 | 5/2017 | Wagner et al. |
| 2017/0136632 A1 | 5/2017 | Wagner et al. |

(56) References Cited

U.S. PATENT DOCUMENTS

| | | | |
|---|---|---|---|
| 2018/0117773 | A1 | 5/2018 | Odhner et al. |
| 2018/0281202 | A1 | 10/2018 | Brudniok et al. |

FOREIGN PATENT DOCUMENTS

| | | | |
|---|---|---|---|
| DE | 102005018207 A1 | 10/2006 | |
| DE | 102010002317 A1 | 8/2011 | |
| DE | 102012009011 A1 | 12/2012 | |
| EP | 1348873 B1 | 12/2004 | |
| EP | 1256421 B1 | 1/2008 | |
| EP | 2181814 A1 | 5/2010 | |
| EP | 2960024 A2 | 12/2015 | |
| FR | 2527968 A1 | 12/1983 | |
| FR | 259287 A1 | 1/1987 | |
| JP | 6155399 A | 3/1986 | |
| JP | H0769470 A | 3/1995 | |
| JP | 2010201536 A | 9/2010 | |
| WO | 2014161549 A1 | 10/2014 | |
| WO | 2015162390 A1 | 10/2015 | |
| WO | 2016070412 A1 | 5/2016 | |
| WO | 2017035466 A1 | 3/2017 | |
| WO | 2017036812 A1 | 3/2017 | |
| WO | 2017044632 A1 | 3/2017 | |
| WO | 2018017616 A1 | 1/2018 | |

OTHER PUBLICATIONS

International Search Report and Written Opinion in related International Application No. PCT/US2016/065371 issued by the International Search Authority dated Mar. 1, 2017, 11 pages.
International Preliminary Report on Patentability issued by the International Bureau of WIPO in related International Application No. PCT/US2016/065371 dated Jul. 10, 2018, 8 pages.
Herbert et al., A Robotic Gripper System for Limp Material Manipulation: Hardware and Software Development and Integration, Proc. of IEEE, Int'l Conf. on Robotics & Automation, Apr. 1997, pp. 15-21.
Moura et al., Neural Network Based Perturbation Identification Approach for High Accuracy Tracking Control of Robotic Manipulators, Proc. of IMECE—ASME Int'l Mech. Eng. Cong., Nov. 2003, pp. 189-197.
Vittor et al., Flexible Robotic Gripper for Automation of Assembly Tasks: A Technology Study on a Gripper for Operation in Shared Human Environment, Proc. of ASME—Dynamic Sys. and Control Div., DSC-vol. 72-2, Nov. 2003, 7 pages.
Liu et al., Hard-Arm Coordination for a Tomato Harvesting Robot Based on Commercial Manipulator, Proc. of IEEE—Int'l Conf. on Robotics and Biometrics, Dec. 2013, pp. 2715-2720.
Non-Final Office Action issued for U.S. Appl. No. 15/371,921 dated Jul. 31, 2017, 8 pages.
Final Office Action issued for U.S. Appl. No. 15/371,921 dated Feb. 22, 2018, 7 pages.
Non-Final Office Action issued for U.S. Appl. No. 15/992,841 dated Nov. 15, 2018, 8 pages.
Non-Final Office Action issued for U.S. Appl. No. 15/992,841 dated Mar. 26, 2019, 7 pages.
Non-Final Office Action issued for U.S. Appl. No. 16/390,634 dated Jul. 3, 2019, 6 pages.
Communication pursuant to Rules 161(1) and 162 EPC issued by the European Patent Office in relation to EP Application No. 16820066.5 on Aug. 31, 2018, 3 pages.
First Office Action issued by Innovation, Science and Economic Development Canada dated Jul. 9, 2019 in relation to Canadian Application No. 3,009,648, 5 pages.
Klingbeil et al., Grasping with Application to an Autonomous Checkout Robot, retrieved from https://www.researchgate.net/publication/224252695 on Jul. 11, 2016, 9 pages.
Carlisle, et al., A Pivoting Gripper for Feeding Industrial Parts, IEEE 1994, pp. 1650-1755.
Final Office Action issued for U.S. Appl. No. 16/390,634 dated Dec. 30, 2019, 6 pages.
Non-Final Office Action issued by the U.S. Patent and Trademark Office in related U.S. Appl. No. 16/390,634 dated Apr. 6, 2020, 7 pages.
Examiner's Report issued by Innovation, Science and Economic Development Canada in relation to Canadian Application No. 3,009,648 dated Mar. 4, 2020, 3 pages.
First Office Action issued by the China Intellectual Property Administration in related Chinese Patent Application No. 201680077928.7 dated Aug. 5, 2020, 24 pages.
Examiner's Report issued by Innovation, Science and Economic Development Canada in relation to Canadian Application No. 3,009,648 dated Aug. 21, 2020, 4 pages.
Non-Final Office Action issued by the U.S. Patent and Trademark Office in related U.S. Appl. No. 16/814,658 dated Jun. 15, 2021, 10 pages.

SYSTEMS AND METHODS FOR ACQUIRING AND MOVING OBJECTS

PRIORITY

The present application is a continuation application of U.S. patent application Ser. No. 16/814,658 filed Mar. 10, 2020, which is a continuation application of U.S. patent application Ser. No. 16/390,634 filed Apr. 22, 2019, which is a continuation application of U.S. patent application Ser. No. 15/992,841 filed May 30, 2018 (issued on Jul. 2, 2019 as U.S. Pat. No. 10,335,956), which is a continuation application of U.S. patent application Ser. No. 15/371,921 filed Dec. 7, 2016 (issued on Jul. 3, 2018 as U.S. Pat. No. 10,011,020), which claims priority to U.S. Provisional Patent Application Ser. No. 62/276,653 filed Jan. 8, 2016, the disclosures of all of which are hereby incorporated by reference in their entireties.

BACKGROUND

The invention generally relates to programmable motion systems and relates in particular to end effectors for programmable motion devices (i.e., robotic systems) for use in object processing such as object sortation.

End effectors for robotic systems, for example, may be employed in certain applications to select and grasp an object, and then move the acquired object very quickly to a new location. End effectors that are designed to very securely grasp an object during movement may have limitations regarding how quickly and easily they may select and grasp an object from a jumble of dissimilar objects. Conversely, end effectors that may quickly and easily grasp a selected object from a jumble of dissimilar objects may have limitations regarding how securely they may grasp an acquired object during rapid movement, particularly rapid acceleration and deceleration (both angular and linear).

Many end effectors employ vacuum pressure for acquiring and securing objects for transport or subsequent operations by articulated arms. Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

There remains a need therefore, for an end effector in a programmable motion system that may select and grasp an object, and then move the acquired object very quickly to a new location.

SUMMARY

In accordance with an embodiment, the invention provides an end effector system for a robotic system. The end effector system includes a primary acquisition system that includes a primary end effector, and a secondary retention system that substantially surrounds at least a portion of the primary acquisition system, wherein at least a portion of the primary acquisition system may be drawn up within at least a portion of the secondary retention system such that the primary end effector system may be used to select an object from a plurality of objects, and the secondary retention system may be used to secure the object for rapid transport to an output destination.

In accordance with another embodiment, the invention provides an end effector system for a robotic system. The end effector system includes a primary acquisition system that includes a primary end effector, and a secondary retention system proximate to the primary gripper system such that the primary end effector system may be used to select an object from a plurality of objects, and the secondary retention system may be used to retain the object for rapid transport to an output destination.

In accordance with a further embodiment, the invention provides a method of engaging and moving an object using a robotic system. The method includes the steps of engaging the object with a primary end effector of a primary acquisition system, moving the object toward a secondary retention system, retaining the object with the secondary retention system, and transporting the object to an output destination.

BRIEF DESCRIPTION OF THE DRAWINGS

The following description may be further understood with reference to the accompanying drawings in which.

The drawings are shown for illustrative purposes only.

DETAILED DESCRIPTION

In accordance with various embodiments, the invention provides end effector systems that include two elements, one element for acquisition, and one element for secure holding during transportation. The acquisition element may be specialized to address challenges of acquisition, which may include perception of a desired object, separating the object from supporting or surrounding objects, and shifting the object to a position and orientation suited for transportation.

The secure holding element may be specialized to address challenges of transportation, which may include security and stability during transport, despite gravitational forces, high speed acceleration, centrifugal forces, and contact with surrounding objects.

Generally and in certain embodiments, the invention provides an end effector system for a robotic system, e.g., an articulated arm robotic system or any of a delta, gantry, spherical, SCARA, or cylindrical robotic systems. The end effector system includes a primary gripper system and a secondary retention system that substantially surrounds at least a portion of the primary gripper system. In certain embodiments, at least a portion of the primary gripper system may be drawn up within at least a portion of the secondary retention system such that the primary gripper system may be used to select an object from a plurality of objects, and the secondary retention system may be used to secure the object for rapid transport to an output destination.

More generally, and in accordance with a further embodiment, the invention provides a method of engaging and moving an object using a robotic system. The method includes the steps of engaging the object with a primary gripper system, moving the object toward a secondary retention system, retaining the object with the secondary retention system, and transporting the object to an output destination.

Figure 1:
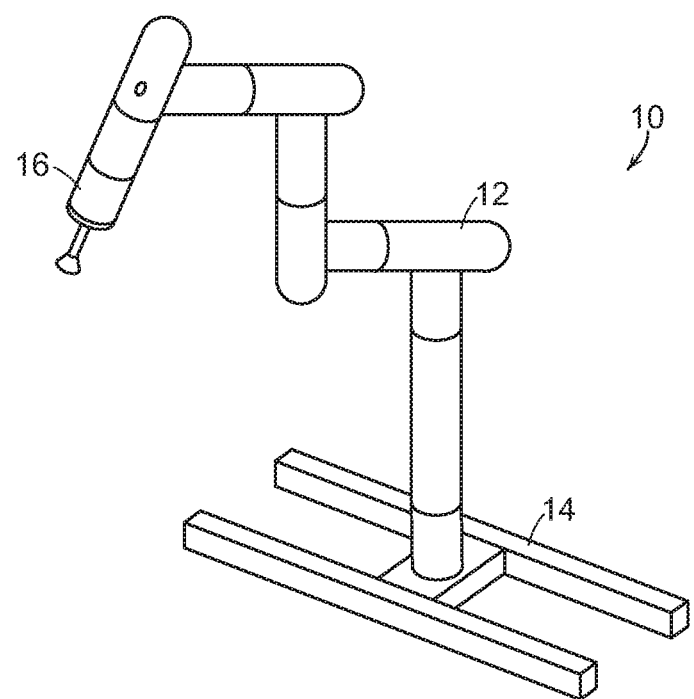
FIG. 1 shows an illustrative diagrammatic view of a system in accordance with an embodiment of the present invention.
Figure 2:
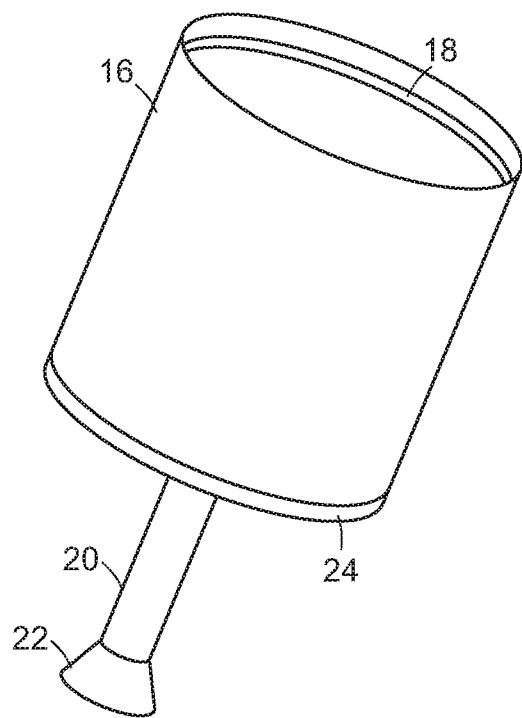
FIG. 2 shows an illustrative diagrammatic view of an end effector portion of the system of FIG. 1.

FIG. 1 shows a robotic system 10 in accordance with embodiments of the invention that includes an articulated arm 12 on a base 14, and an end effector system 16. As further shown in FIG. 2, the end effector system may attach to the articulated arm 12 by way of an engagement feature 18 (such as threads, spring-loaded clasp, or ball and socket engagement) that mate with an engagement feature on the articulated arm 12, and further, the end effector system may include a primary gripper system including a gripper 22 on the end of an extender 20, as well as secondary retention system 24 as discussed in more detail below. As each of the acquisition element and the secure holding element may vary, and many different embodiments are possible. The gripper in each of the embodiments, for example, may be any of a vacuum gripper, an electrostatic gripper, or a magnetic gripper etc.

Figure 3A:
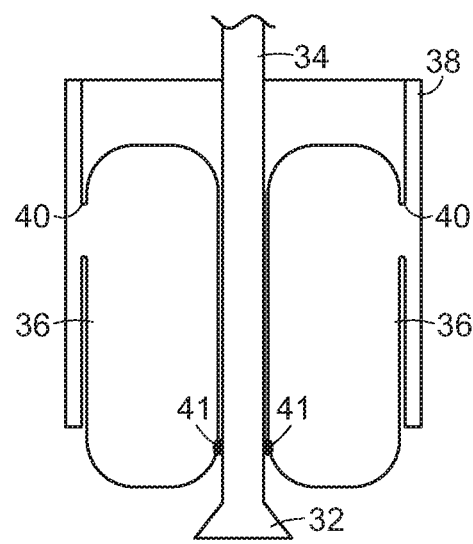
FIGS. 3A-3C show illustrative diagrammatic sectional views of the end effector portion in accordance with an embodiment including a tubular annulus during acquisition and retention of an object.
Figure 3C:
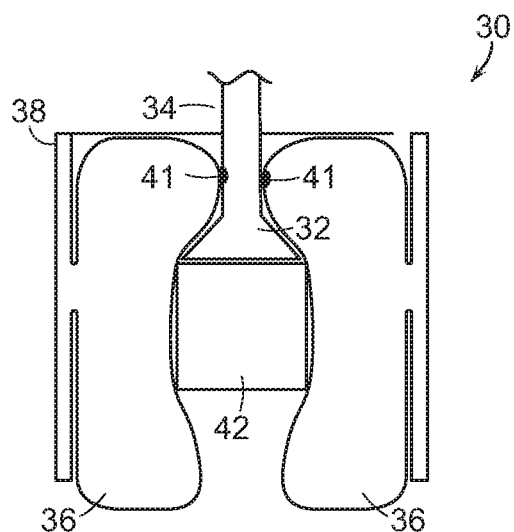
Figure 3B:
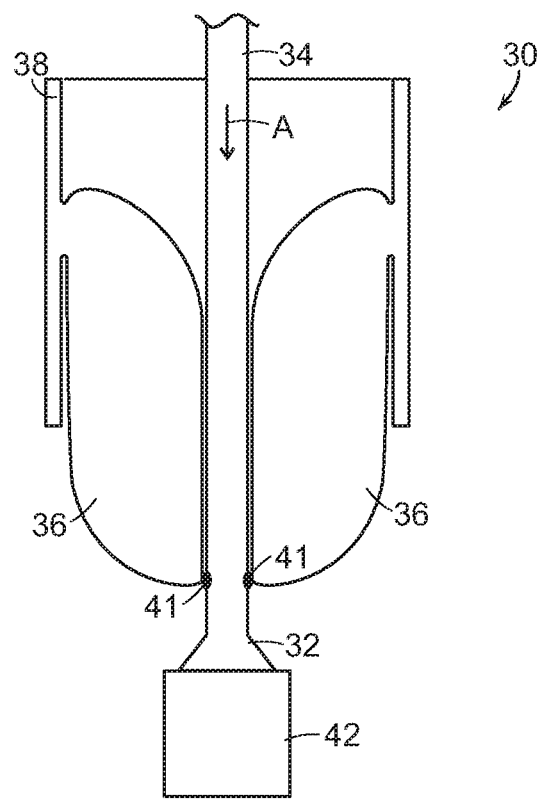

FIGS. 3A-3C diagrammatically show sectional views of an end effector system 30 in accordance with an embodiment of the present invention that includes a primary gripper system including a gripper 32 on the end of an extender 34. The end effector system 30 also includes a secondary retention system including a flexible toroid 36.

The flexible toroid is a fluid-filled or powder filled (and optionally elastic) flexible membrane that is compressed and inverted as it is drawn into the center of the supporting structure. Such a device is formed of a continuous sheet of fabric that is in the form of a torus, or an annulus that extends along the direction that extends through the center of the annulus.

As shown in FIG. 3A, a portion of the outer surface of the flexible toroid 36 is attached to the inner surface of the housing 38 as shown at 40, and a portion of the inner surface of the elastic toroid is attached to the extender at 41. The toroid is able to move up and down (by rolling) between the outer collar and the inner extender.

With reference to FIG. 3B, the extender 34 may be moved in the direction as indicated at A such that the vacuum gripper 32 engages an object to be grasped 42. By supplying a vacuum source through the extender 34, the object may be engaged. As further shown in FIG. 3B, when the extender 34 is moved in the direction as indicated at A, it draws the inner surface of the elastic toroid with it, which causes one end of the elastic toroid to roll inward upon itself in direction A, while the opposing end of the elastic toroid will roll outward. While the elastic toroid 36 undergoes this process of everting, it remains attached to the housing 38 at the attachment 40.

As shown in FIG. 3C, when the engaged object is pulled into the elastic toroid, the object is securely engaged for transport or other processing operations. By controlling the movement of the elastic toroid as described above, the end effector may be used to draw the object 42 into the elastic toroid and hold it within the elastic toroid until the linear actuator is moved in a direction that is opposite the direction indicated at A (and the object 42 is discharged). The elastic toroid is formed of a flexible material that may conform to the shape of the object 42 being grasped. The fluid (or powder) within the elastic toroid may be water (or plastic particles) or may be selected to have a particular viscosity.

Figure 4A:
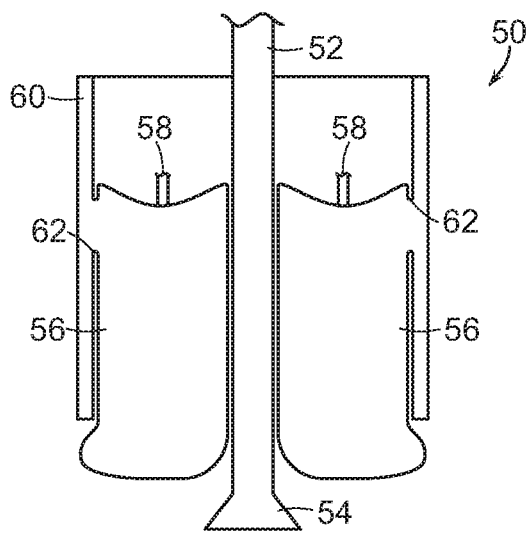
FIGS. 4A-4D show illustrative diagrammatic sectional views of the end effector portion in accordance with another embodiment including a jamming gripper during acquisition and retention of an object.
Figure 4C:
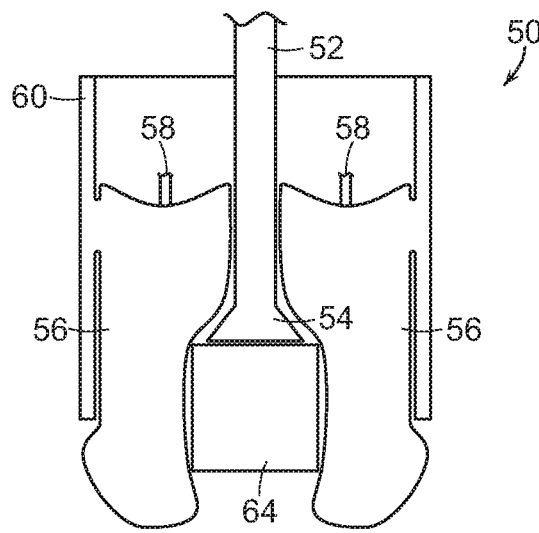
Figure 4B:
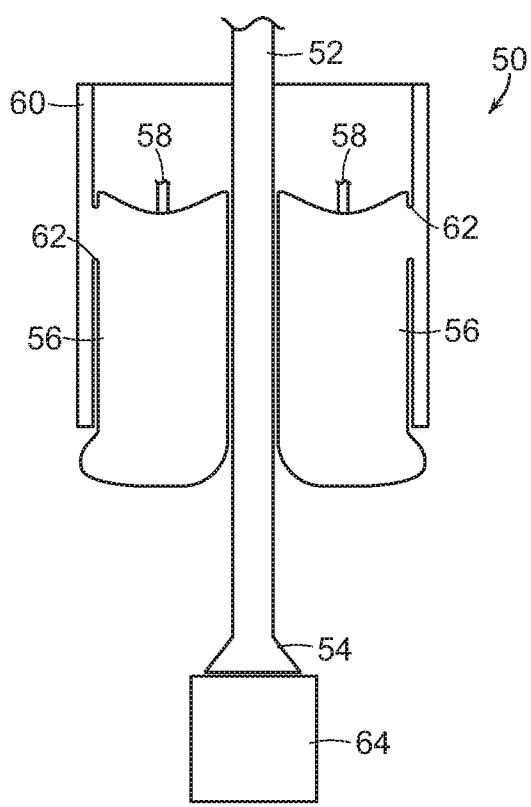

As shown in FIGS. 4A-4C (which show diagrammatic sectional views), an end effector system 50 in accordance with another embodiment of the present invention includes a primary gripper system including a gripper 54 on the end of an extender 52. The end effector system 50 also includes a secondary retention system including a jamming gripper 56 having one or more vacuum attachment ports 58. Generally, the jamming gripper encloses a fluid or volume of particles having a very small size (e.g., powder) such that when a vacuum source is provided to the ports 58, the jamming gripper 56 reduces its volume and grabs any object within its outer edge. The jamming gripper 56 is also attached to the interior of the housing 60 as shown at 62.

Figure 4D:
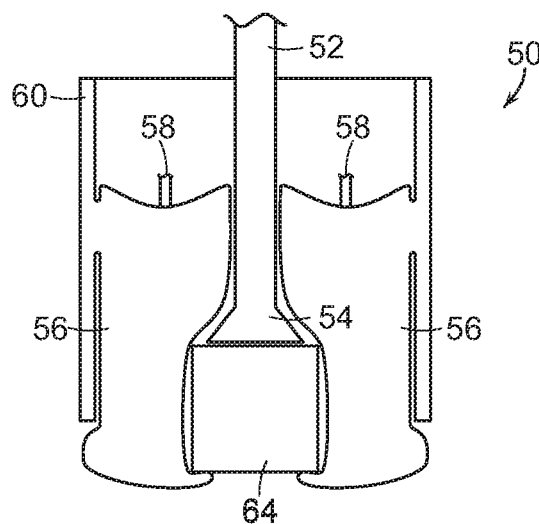

As shown in FIG. 4B, the extender 52 may be extended, permitting the gripper 54 to engage an object 64, and as shown in FIG. 4C, when the object is drawn up near or into the jamming gripper 56, the jamming gripper engages at least a portion of the outer surface of the object 64. As shown in FIG. 4D, when the vacuum source is applied to the jamming gripper 56, the gripper 56 conforms to the surface of the object 64, thereby securing the object 56 for transport or other processing operations.

In each of the embodiments of FIG. 3A-4D, the secondary retention system may have difficulty engaging an object from an input area, but when combined with the primary gripper system, the end effector systems may acquire an object and subsequently securely retain the object, even when the end effector system undergoes rapid linear and angular acceleration or deceleration.

Figure 5A:
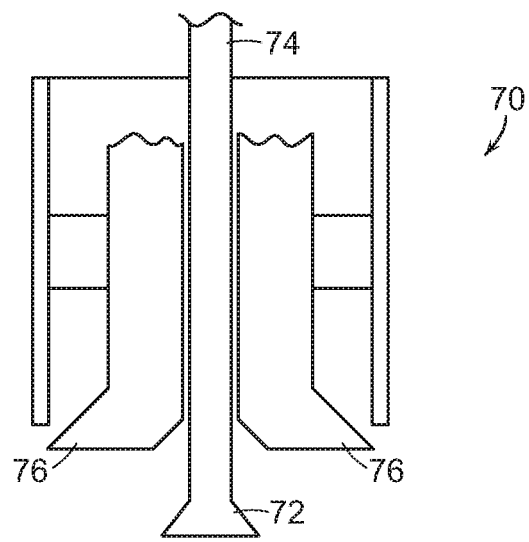
FIGS. 5A-5C show illustrative diagrammatic sectional views of the end effector portion in accordance with a further embodiment including vacuum cups during acquisition and retention of an object.
Figure 5B:
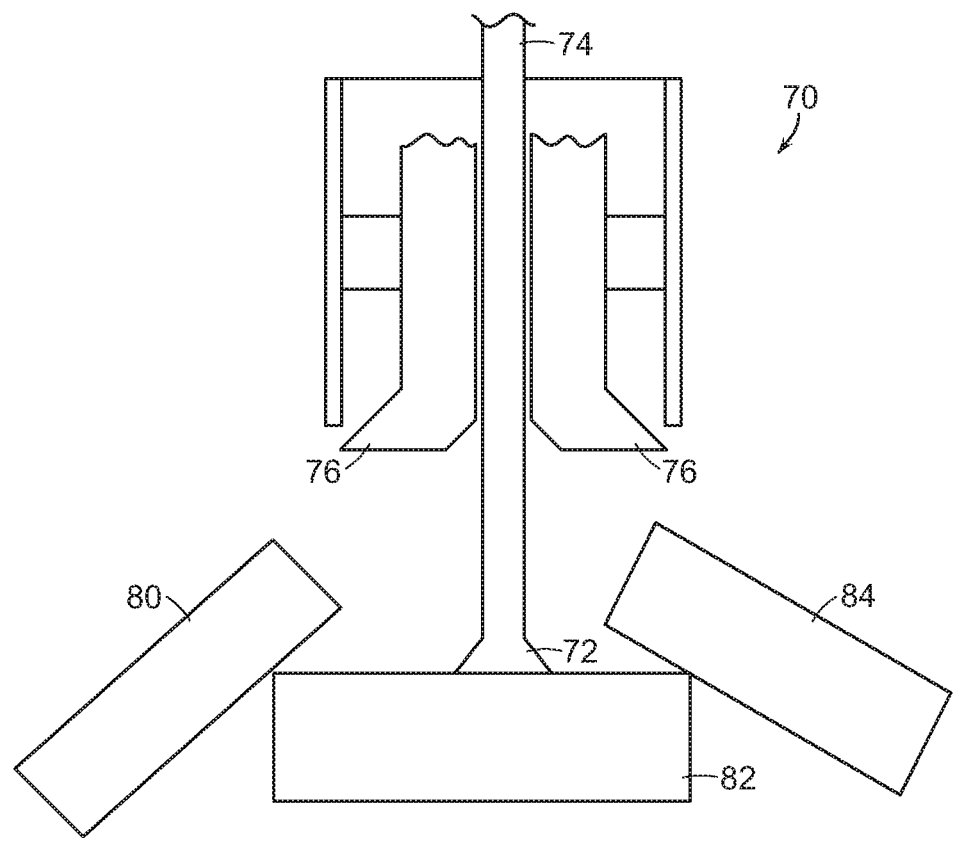
Figure 5C:
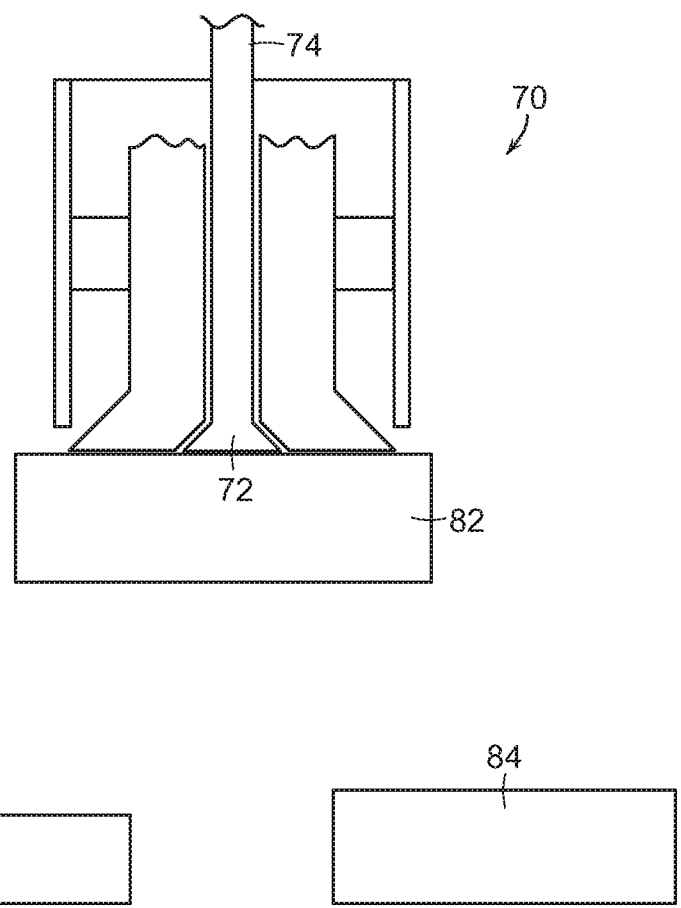

As shown in FIGS. 5A-5C (which show diagrammatic sectional views), an end effector system 70 in accordance with another embodiment of the present invention includes a primary gripper system including a gripper 72 on the end of an extender 74. The gripper 72 may be any of a vacuum gripper, an electrostatic gripper, or a magnetic gripper etc. The end effector system 70 also includes a secondary retention system including a large area gripper 76 (e.g., a vacuum gripper, an electrostatic gripper, or a magnetic gripper etc.) that surrounds the extender 74. As shown in FIG. 5B, when the gripper 72 is extended into a cluttered environment (including, e.g., objects 80, 82, 84), the gripper 72 may engage an object 82, and draw the object toward the large area gripper 76, which then surrounds the gripper 72. The large area gripper 76 is then employed during rapid transport or further processing operations.

FIGS. 6A-6D show a diagrammatic sectional view of an end effector system 90 in accordance with another embodiment of the present invention, which includes a primary gripper system including a gripper 92 on the end of an extender 94. The gripper 92 may be any of a vacuum gripper, an electrostatic gripper, or a magnetic gripper etc. The end effector system 90 also includes a secondary retention system including two or more constricting actuators 96 (e.g., pinch grippers), that may be rotated with respect to pivot locations 98 such that a portion of each actuator 96 may engage a portion of an object to thereby secure the object.

Figure 6A:
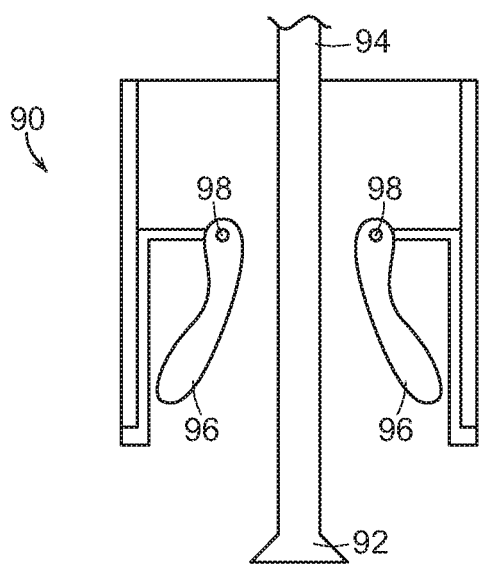
FIGS. 6A-6D show illustrative diagrammatic sectional views of the end effector portion in accordance with a further embodiment including gripping retention actuators during acquisition and retention of an object.
Figure 6C:
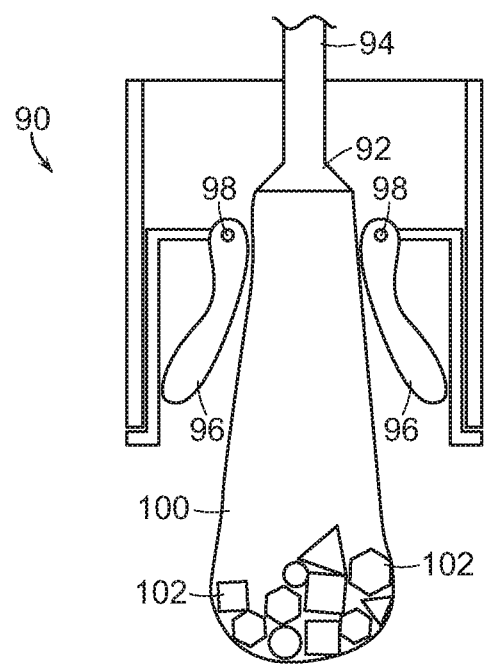
Figure 6B:
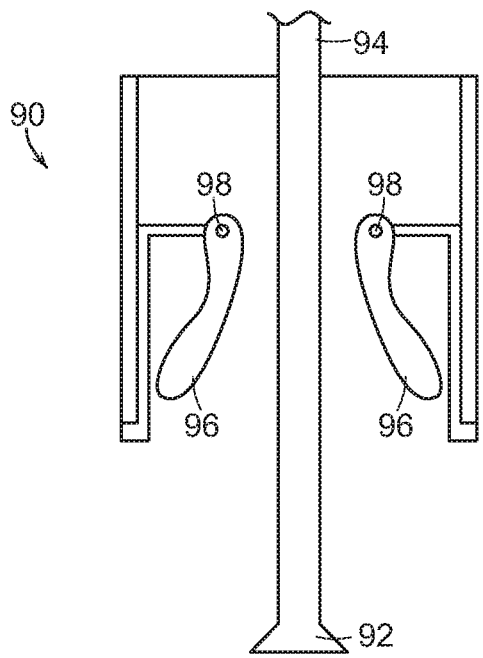
Figure 6B:
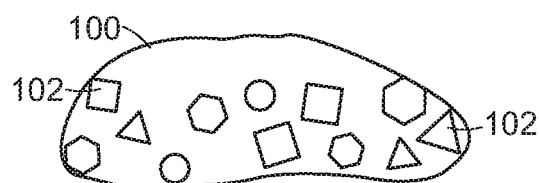
Figure 6D:
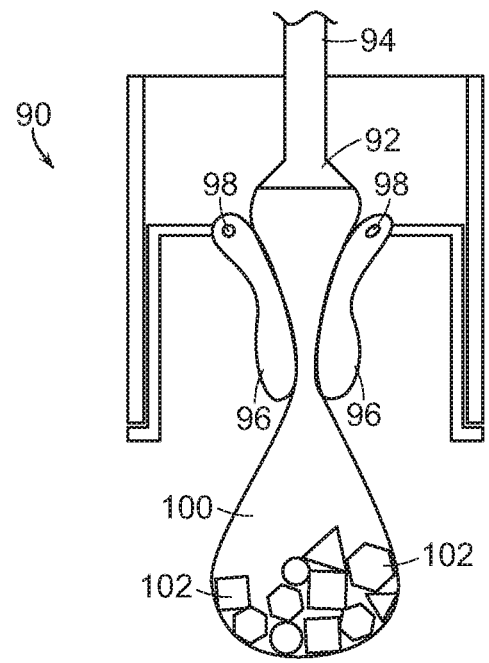

In particular, as shown in FIG. 6B, the actuator 92 may be extended to engage an object such as a bag 100 that includes loose items 102. As shown in FIGS. 6C and 6D, the bag 100 may be acquired by the gripper 92, and the constricting actuators 96 may then be rotated to secure the bag 100 within the end effector system 90.

Figure 7A:
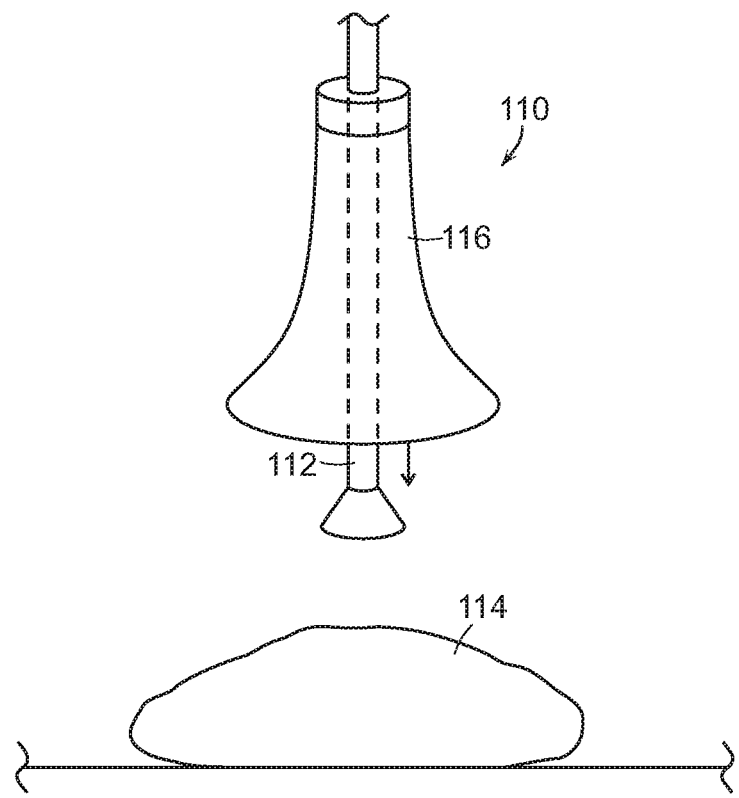
FIGS. 7A and 7B show illustrative diagrammatic sectional views of the end effector portion in accordance with a further embodiment including a retention shroud during acquisition and retention of an object.
Figure 7B:
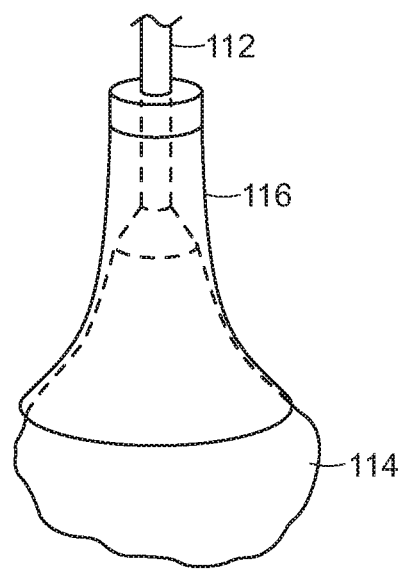

FIGS. 7A and 7B show an end effector 110 in accordance with another embodiment of the invention that includes a first portion 112 having a vacuum cup that may be actuated to engage an object 114, and then may withdraw the grasped object within a second portion 116 in the form of a shroud. In various embodiments, the first portion 112 may move toward the object while the shroud 116 remains fixed, or in other embodiments, the first portion may be fixed, and the shroud 116 may be actuated to move toward the object 114 once grasped.

Figure 8A:
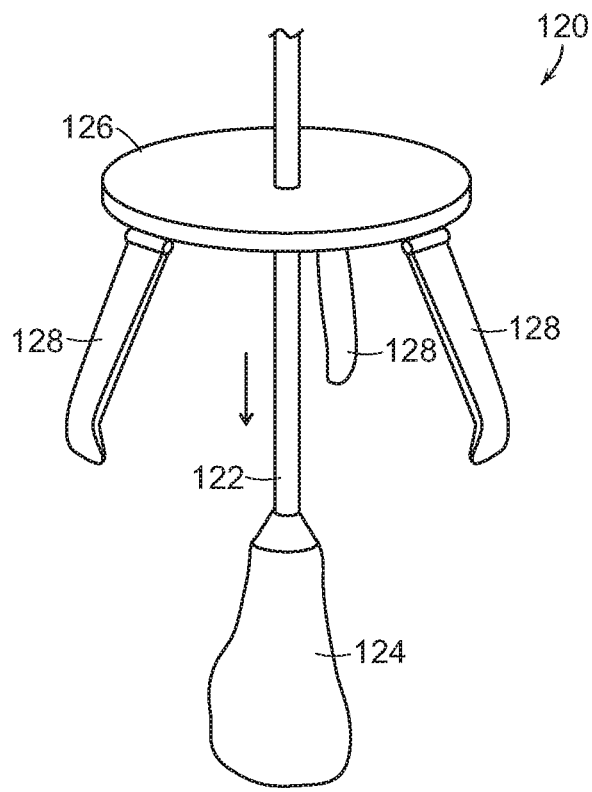
FIGS. 8A and 8B show illustrative diagrammatic sectional views of the end effector portion in accordance with an embodiment including further gripping retention actuators during acquisition and retention of an object.
Figure 8B:
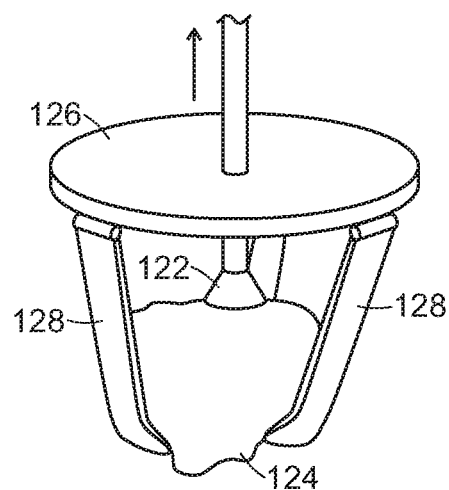

FIGS. 8A and 8B show an end effector 120 in accordance with a further embodiment of the invention that includes a first portion 122 having a vacuum cup that may be actuated to engage an object 124, and then may withdraw the grasped object 124. A second portion 126 that includes two or more paddles 128 then move radially inward as shown at A to secure the grasped object 124.

Figure 9A:
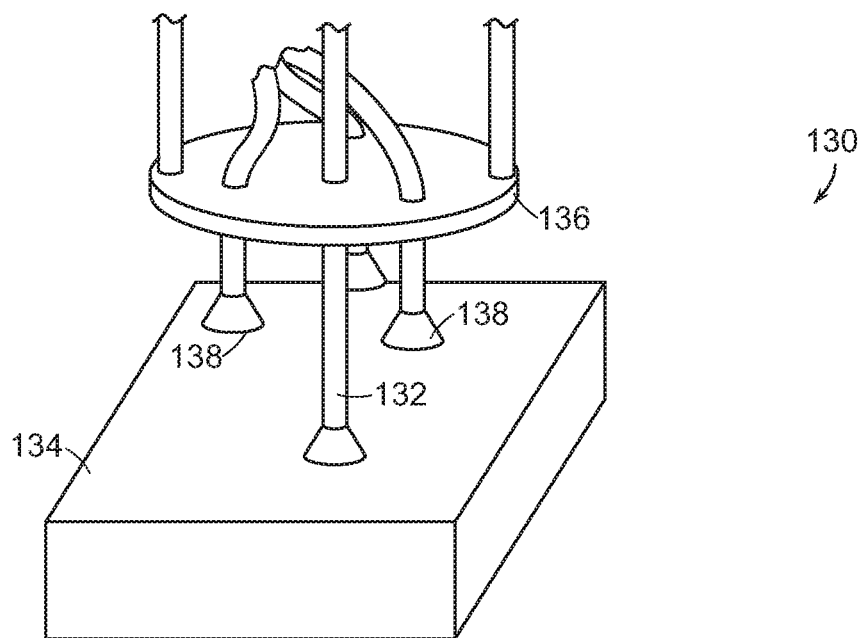
FIGS. 9A and 9B show illustrative diagrammatic sectional views of the end effector portion in accordance with an embodiment including a further arrangement of vacuum cups during acquisition and retention of an object.
Figure 9B:
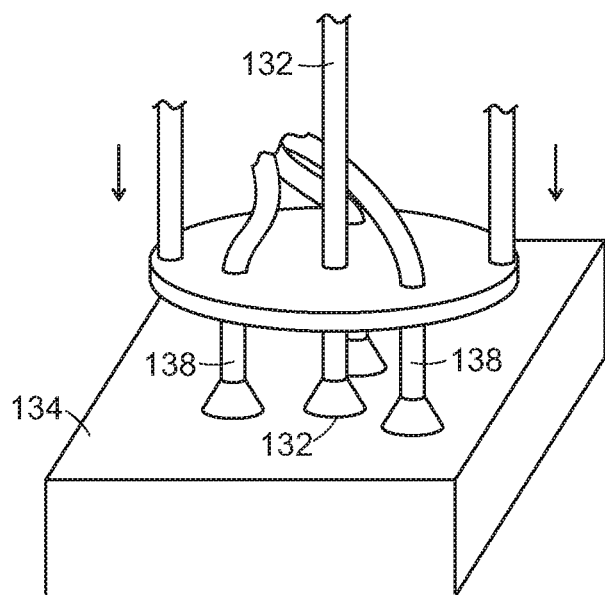

FIGS. 9A and 9B show an end effector 130 in accordance with a further embodiment of the invention that includes a first portion 132 having a vacuum cup that may be actuated to engage an object 134. The object 134 is then withdrawn toward a second portion 136 that includes one or more additional vacuum cups 138 (three are shown) to secure the object 134 during transport. In accordance with further embodiments, the first portion 132 may be fixed with respect to an articulated arm, and the second portion 136 may be lowered onto the object 134.

Figure 10A:
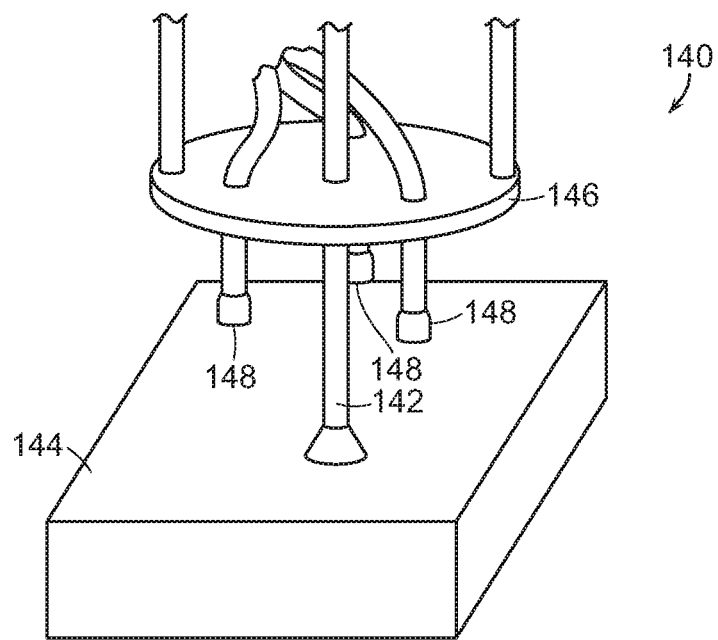
FIGS. 10A and 10B show illustrative diagrammatic sectional views of the end effector portion in accordance with an embodiment including retention stabilizing pads during acquisition and retention of an object.
Figure 10B:
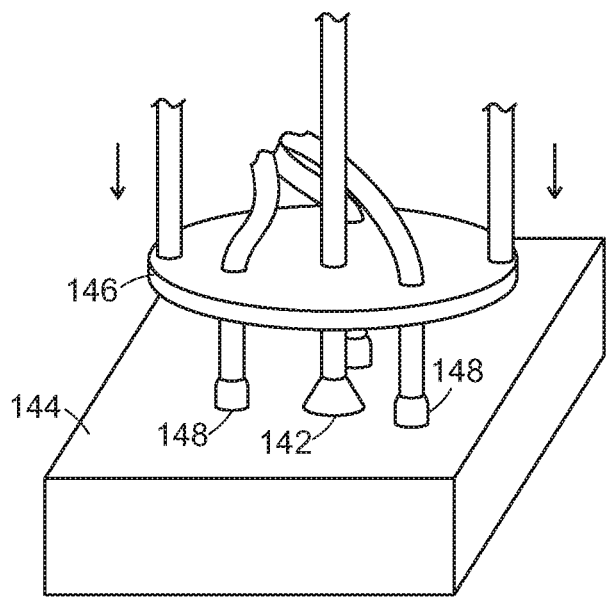

FIGS. 10A and 10B show an end effector 140 in accordance with a further embodiment of the invention that includes a first portion 142 having a vacuum cup that may be actuated to engage an object 144. The object 144 is then withdrawn toward a second portion 146 that includes one or more compliant pads 148 to secure the object 144 during transport. In accordance with further embodiments, the first portion 142 may be fixed with respect to an articulated arm, and the second portion 146 may be lowered onto the object 144.

Figure 11:
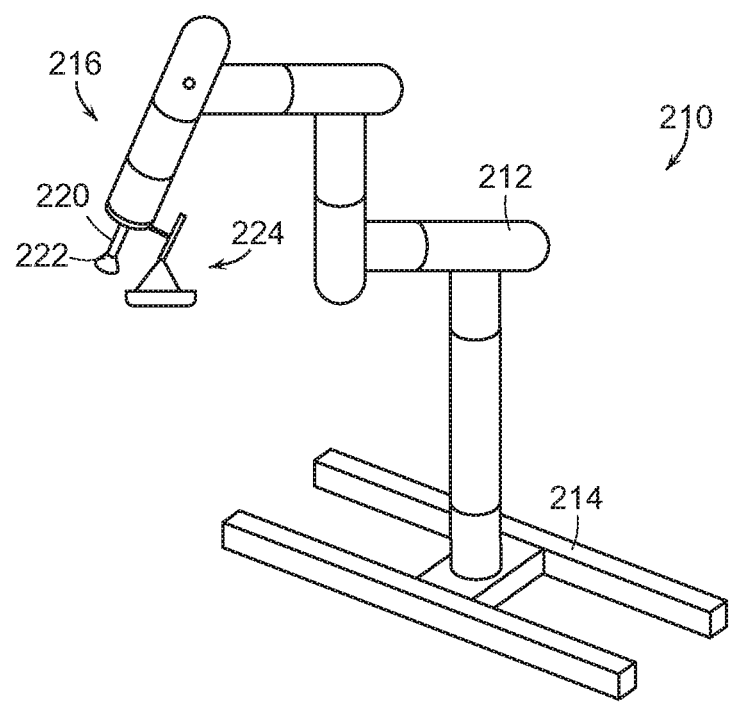
FIG. 11 shows an illustrative diagrammatic view of a system in accordance with a further embodiment of the present invention that includes a retention tray.

FIG. 11 shows a robotic system 210 in accordance with further embodiments of the invention that includes an articulated arm 212 on a base 214, and an end effector system 216. The end effector system may include a primary gripper system including a gripper 222 on the end of an extender 220, as well as secondary retention system 224 as discussed in more detail below with reference to FIGS. 12A-12F. As each of the acquisition element and the transportation element may vary, many different embodiments are possible. The gripper in each of the embodiments, for example, may be any of a vacuum gripper, an electrostatic gripper, or a magnetic gripper etc.

FIGS. 12A-12F diagrammatically show views of the end effector system 216 in accordance with an embodiment of the present invention that includes a primary gripper system including the gripper 222 on the end of the extender 220. The secondary retention system 224 includes a suspended cup 226 that may be mounted on an actuated member 228 such that the suspension point of the cup 226 may be moved relative to the base of the end effector system 216.

Figure 12A:
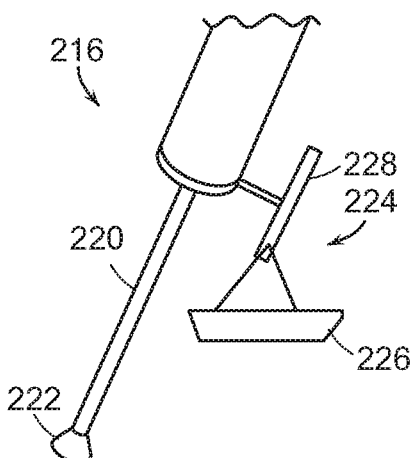
FIG. 12A-12F show illustrative diagrammatic sectional views of the end effector portion in accordance with an embodiment including a retention tray during acquisition, retention and release of an object.
Figure 12C:
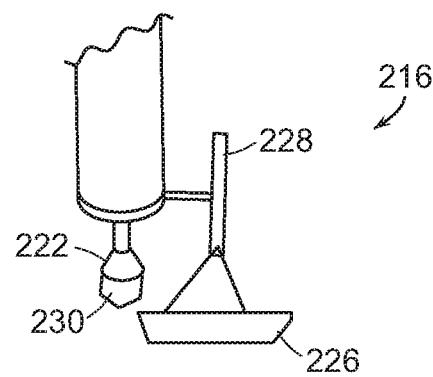
Figure 12B:
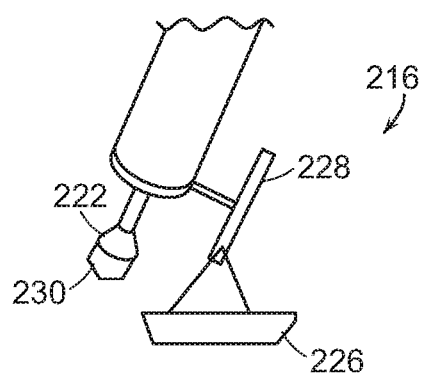
Figure 12D:
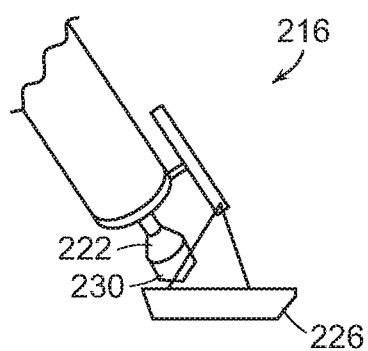
Figure 12E:
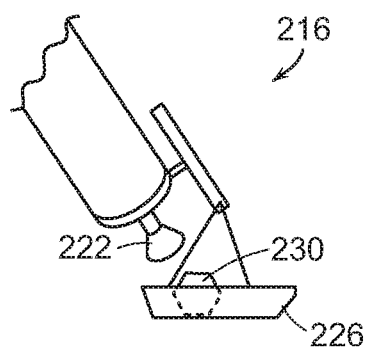
Figure 12F:
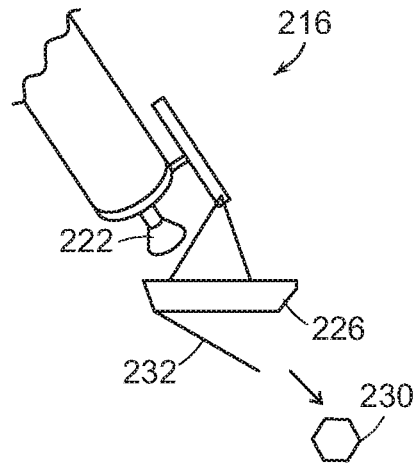

As shown in FIGS. 12A and 12B, the gripper 222 may engage and acquire an object 230, and bring the object 230 toward the suspended cup 226. As shown in FIGS. 12C and 12D, the end effector 216 may then be rotated, causing the suspended cup to move below the object 230. As shown in FIG. 12E, the object 230 may then be dropped into the suspended cup 226. The robotic system may, in certain applications, acquire and place many such objects into a cup prior to transport. Following transport to an output destination, in certain embodiments, the cup 226 may include a releasable bottom 232 that may be actuated to drop the one or more objects into the output destination.

Figure 13:
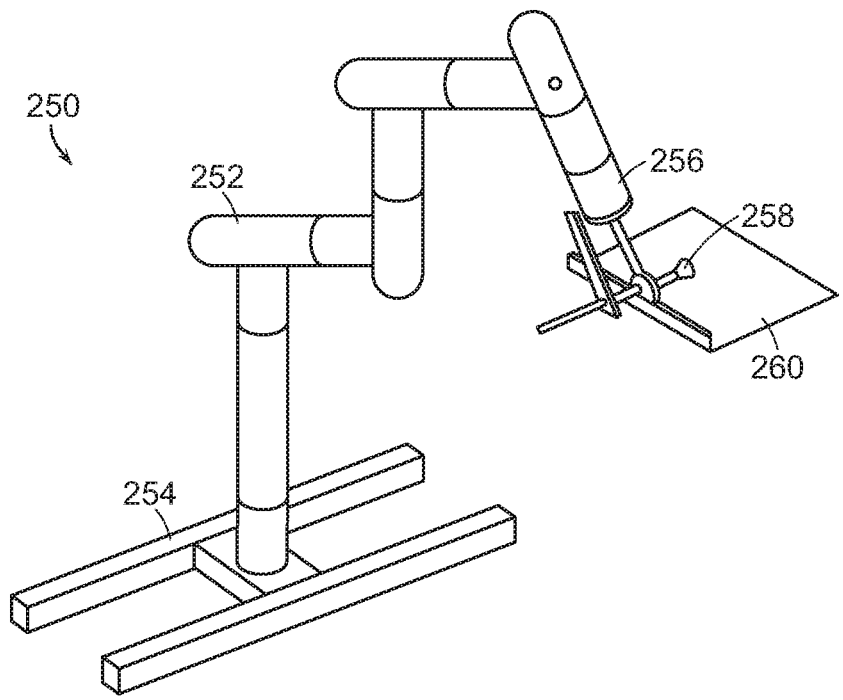
FIG. 13 shows an illustrative diagrammatic view of a system in accordance with a further embodiment of the present invention that includes a retention support.
Figure 14A:
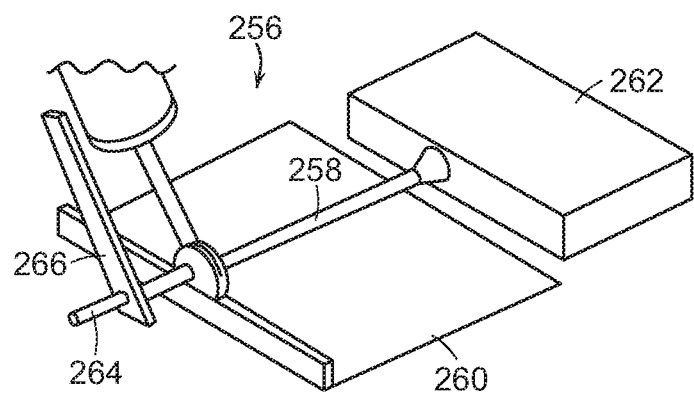
FIGS. 14A and 14B show illustrative diagrammatic sectional views of the end effector portion in accordance with an embodiment including a retention support during acquisition, retention and release of an object.
Figure 14B:
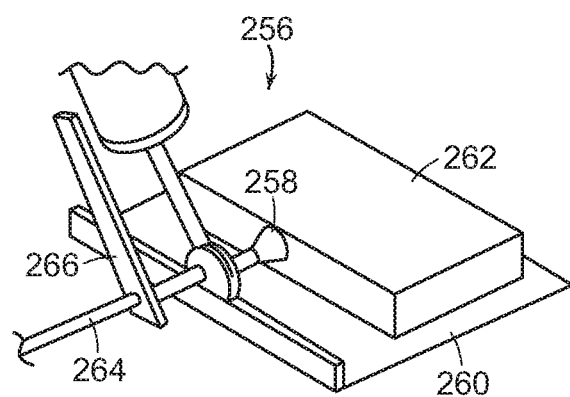
Figure 15:
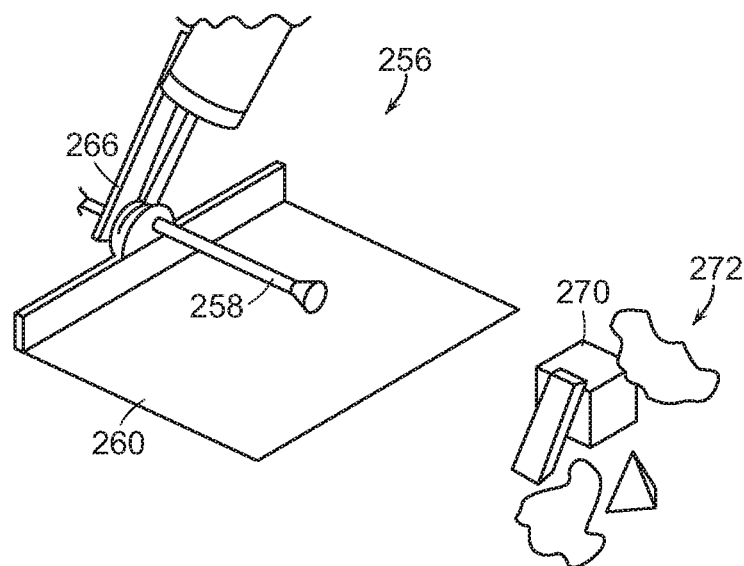
FIG. 15 shows an illustrative diagrammatic view of the end effector system of FIG. 13 approaching a jumble of objects.
Figure 16A:
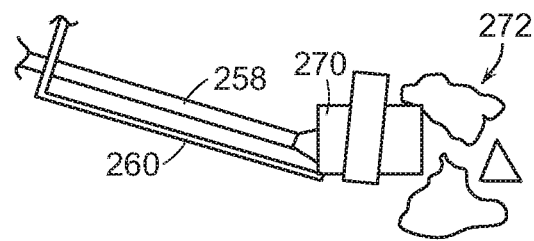
FIGS. 16A and 16B show illustrative diagrammatic sectional views of the end effector portion in accordance with an embodiment of FIG. 15 including a retention support during acquisition and retention of an object.
Figure 16B:
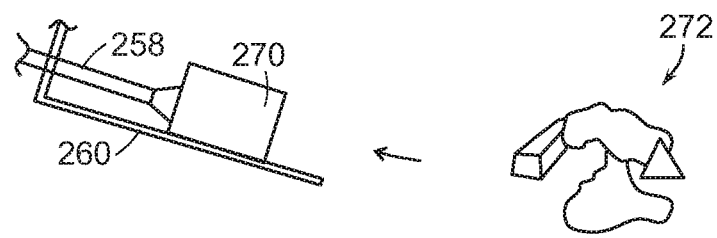

FIG. 13 shows a system 250 that includes an articulated arm 252 on a base 254 as well as an end effector portion 256. The end effector portion 256 includes a primary acquisition portion 258 and a secondary retention system 260. As further shown in FIGS. 14A and 14B, the primary acquisition system includes a vacuum cup on an actuator shaft 264 that passes through an actuatable magnetic coil within arm 266. The secondary retention system 260 includes a tray for supporting the object 262 once grasped as shown in FIG. 14B. As shown in FIG. 15, such an end effector portion 256 may also be employed to selectively pull one object (e.g., 270) from a mix of objects 272. As shown in FIGS. 16A and 16B, the primary acquisition system 258 may acquire the object 270, and the secondary retention system may then support the retained object 270.

Figure 17:
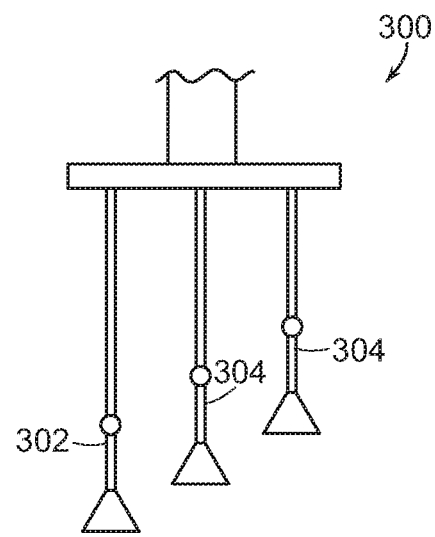
FIG. 17 shows an illustrative diagrammatic view of a system in accordance with a further embodiment of the present invention that includes multiple vacuum cups.
Figure 18A:
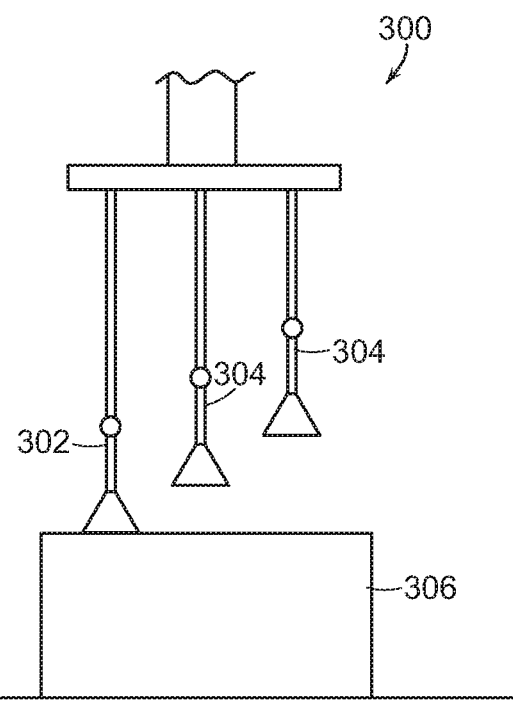
FIGS. 18A-18C show illustrative diagrammatic sectional views of the end effector portion in accordance with an embodiment including multiple vacuum cups during acquisition and retention of an object.
Figure 18B:
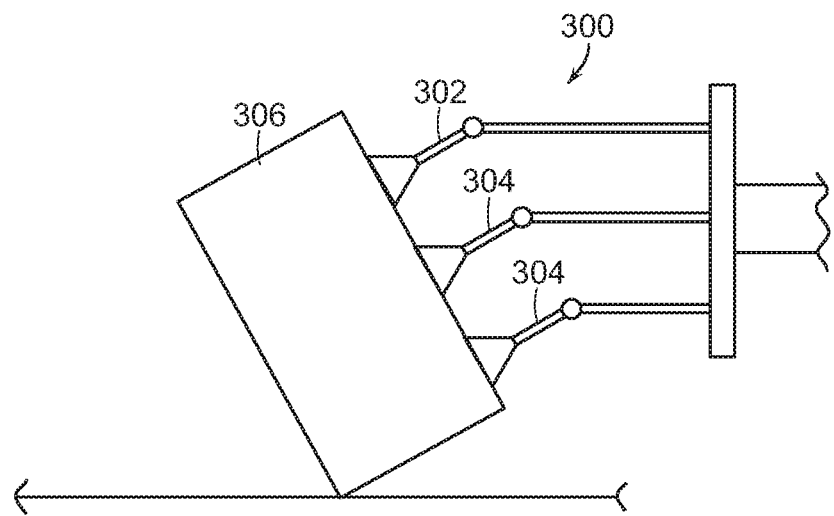
Figure 18C:
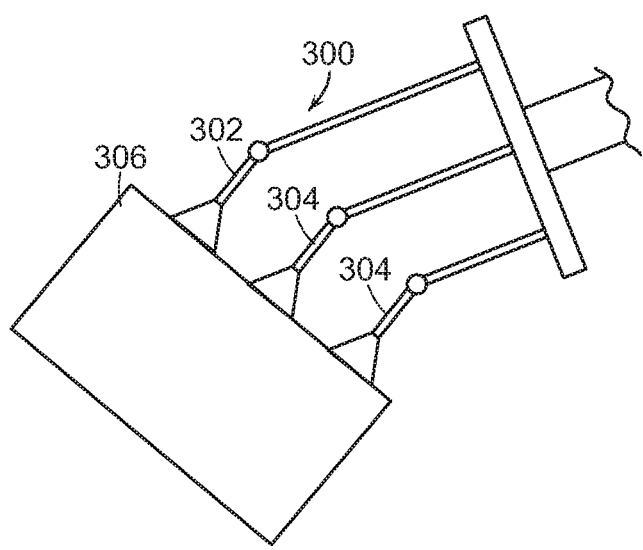

In accordance with further embodiments, and as shown in FIG. 17, a system 300 of the invention may provide an end effector system that includes a primary acquisition system 302 and a secondary retention system 304, each of which includes a vacuum cup and a pivot joint. When the primary acquisition system 302 engages an object 306 (as shown in FIG. 18A), the end effector then rotates (as shown in FIG. 18B) such that the secondary retention system 304 also grasp the object 306 so that it may then be lifted and moved (as shown in FIG. 18C).

Figure 19A:
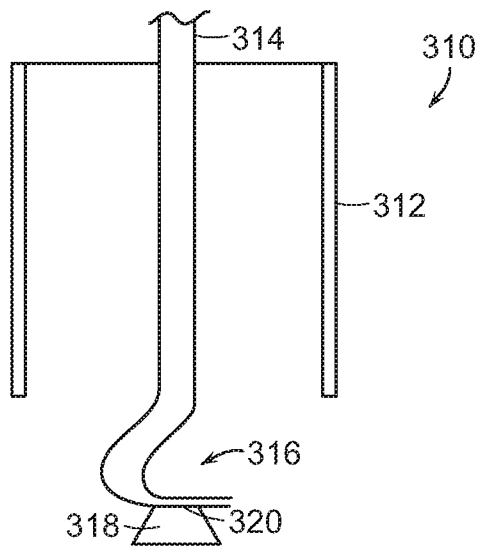
FIGS. 19A and 19B show illustrative diagrammatic sectional views of the end effector portion in accordance with a further embodiment of the present invention employing positive air pressure to create a vacuum at the end effector.
Figure 19B:
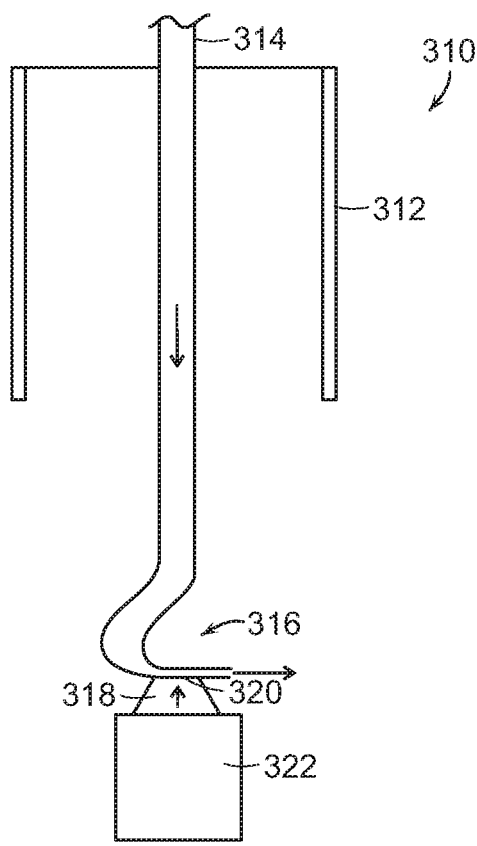

Again, the gripper attached to the programmable motion extender in each of the embodiments may be any of a vacuum gripper, an electrostatic gripper, or a magnetic gripper etc. In other embodiments, both the primary gripper system and the secondary retention system may involve a wide variety of acquisition and retention systems. For example, in accordance with further embodiments, any of the above disclosed systems may be provided with a vacuum source at the end effector wherein the vacuum is provided by a Venturi opening at the end effector. FIGS. 19A and 19B show an example of a primary retention system 310 (that may be used with any of the above discussed embodiments), and includes a conduit 314 for selectively providing air at positive pressure to an end effector 318. The conduit (which is provided within a second retention system 312 as discussed above), includes an area of restricted diameter 316 as well as a Venturi opening 320. When positive air pressure is provided (as shown in FIG. 19B), the air blows out the end of the conduit and produces a vacuum source at the opening 320, thereby permitting the end effector 318 to acquire an object 322. Again, such a positive air pressure and Venturi system for providing the vacuum, may be used with each of the above embodiments.

Those skilled in the art will appreciate that numerous modifications and variations may be made to the above disclosed embodiments without departing from the spirit and scope of the present invention.

What is claimed is:

1. An end effector for use in a robotic articulated arm, said end effector comprising:
    an acquisition portion that includes a shaft and a vacuum cup at a distal end thereof;
    a retention portion that includes three actuatable paddles uniformly spaced apart and pivotally coupled to a base, wherein the shaft of the acquisition portion is retractable relative to the base surrounded by the three actuatable paddles,
    wherein the shaft of the acquisition portion is extended relative to the base for moving the vacuum cup away from the three actuatable paddles into contact with an object along a first direction and retracted relative to the base for moving the object towards the three actuatable paddles of the retention portion along a second direction that is opposite the first direction, and wherein the vacuum cup applies a vacuum to grasp the object, and
    wherein the three actuatable paddles of the retention portion pivot inward and at least partially under the object in mutually non-opposing directions to assist the vacuum cup in grasping the object.

2. The end effector as claimed in claim 1, wherein the shaft includes a conduit of air at a vacuum pressure.

3. The end effector as claimed in claim 1, wherein the shaft includes a conduit of air at a positive pressure that is provided to a Venturi opening at or near the vacuum cup.

4. The end effector as claimed in claim 1, wherein the vacuum cup of the acquisition portion is a flexible vacuum cup.

5. The end effector as claimed in claim 4, wherein the flexible vacuum cup includes a bellows.

6. The end effector as claimed in claim 1, wherein the object is releasable from the acquisition portion to the retention portion once the object is grasped by the retention portion.

7. The end effector as claimed in claim 1, wherein a non-engaged portion of the object is allowed to hang below a portion of the object that is pinched between the three actuatable paddles of retention portion.

8. The end effector as claimed in claim 1, wherein the three actuatable paddles pivot inward along directions that are about 120 degrees radially separated.

9. The end effector as claimed in claim 1, wherein the three actuatable paddles are angled inward to press into the object.

10. The end effector as claimed in claim 9, wherein the three actuatable paddles include tip portions that press into the object.

11. The end effector as claimed in claim 10, wherein the tip portions engage at least a portion of the object that is between a first surface of the object that is grasped by the vacuum cup, and a second surface of the object that is opposite the first surface of the object.

12. The end effector as claimed in claim 10, wherein the tip portions engage a second surface of the object that is opposite a first surface of the object that is grasped by the vacuum cup.

13. The end effector as claimed in claim 1, wherein the mutually non-opposing directions are radially spaced from one another.

14. An end effector for use in a robotic articulated arm, said end effector comprising:
    an acquisition portion that includes a shaft and a vacuum cup at a distal end thereof;
    a retention portion that includes three actuatable paddles uniformly spaced apart and pivotally coupled to a base, wherein the shaft of the acquisition portion is retractable relative to the base surrounded by the three actuatable paddles,
    wherein the shaft of the acquisition portion is extended relative to the base for moving the vacuum cup away from the three actuatable paddles into contact with an object along a first direction and retracted relative to the base for moving the object towards the three actuatable paddles of the retention portion along a second direction that is opposite the first direction, and wherein the vacuum cup applies a vacuum to grasp the object; and
    wherein the three actuatable paddles of the retention portion pivot inward in mutually non-opposing directions to compressingly engage the object such that a shape of the object changes.

15. The end effector as claimed in claim 14, wherein the shaft includes a conduit of air at a vacuum pressure.

16. The end effector as claimed in claim 14, wherein the shaft includes a conduit of air at a positive pressure that is provided to a Venturi opening at or near the vacuum cup.

17. The end effector as claimed in claim 14, wherein the vacuum cup of the acquisition portion includes a flexible vacuum cup.

18. The end effector as claimed in claim 17, wherein the flexible vacuum cup includes a bellows.

19. The end effector as claimed in claim 14, wherein the object is releasable from the acquisition portion to the retention portion once the object is grasped by the retention portion.

20. The end effector as claimed in claim 14, wherein a portion of the object is allowed to hang below the three actuatable paddles of the retention portion.

21. The end effector as claimed in claim 14, wherein the three actuatable paddles pivot inward along directions that are about 120 degrees radially separated.

22. An end effector for use in a robotic articulated arm, said end effector comprising:
an acquisition portion that includes a shaft and a vacuum cup at a distal end thereof;
a retention portion that includes three actuatable paddles uniformly spaced apart and pivotally coupled to a base, wherein the shaft of the acquisition portion is retractable relative to the base surrounded by the three actuatable paddles,
wherein the shaft of the acquisition portion is extended relative to the base for moving the vacuum cup away from the three actuatable paddles into contact with an object along a first direction and retracted relative to the base for moving the object towards the three actuatable paddles of the retention portion along a second direction that is opposite the first direction; and
wherein the three actuatable paddles of the retention portion pivot inward in mutually non-opposing directions into the object and beyond a position at which the three actuatable paddles initially contact the object.

23. The end effector as claimed in claim 22, wherein the shaft includes a conduit of air at a vacuum pressure.

24. The end effector as claimed in claim 22, wherein the shaft includes a conduit of air at a positive pressure that is provided to a Venturi opening at or near the vacuum cup.

25. The end effector as claimed in claim 22, wherein the vacuum cup of the acquisition cup includes a flexible vacuum cup.

26. The end effector as claimed in claim 25, wherein the flexible vacuum cup includes a bellows.

27. The end effector as claimed in claim 22, wherein the object is releasable from the acquisition portion to the retention portion once the object is engaged by the retention portion.

28. The end effector as claimed in claim 22, wherein a non-engaged portion of the object is allowed to hang below a portion of the object that is pinched between the three actuatable paddles of the retention portion.

29. The end effector as claimed in claim 22, wherein the three actuatable paddles pivot inward along directions that are about 120 degrees radially separated.

* * * * *

UNITED STATES PATENT AND TRADEMARK OFFICE
CERTIFICATE OF CORRECTION

PATENT NO. : 11,370,127 B2
APPLICATION NO. : 17/073693
DATED : June 28, 2022
INVENTOR(S) : Thomas Wagner et al.

It is certified that error appears in the above-identified patent and that said Letters Patent is hereby corrected as shown below:

In the Specification

In Column 2, Line 64, should read:
"FIGS. 12A-12F show illustrative diagrammatic sectional"

In Column 5, Line 12, should read:
"In each of the embodiments of FIGS. 3A-4D, the secondary"

Signed and Sealed this
Twenty-sixth Day of July, 2022

Katherine Kelly Vidal
*Director of the United States Patent and Trademark Office*